US009803707B2

(12) United States Patent
Halfmann

(10) Patent No.: US 9,803,707 B2
(45) Date of Patent: Oct. 31, 2017

(54) DISK BRAKE, IN PARTICULAR FOR UTILITY VEHICLES, AND BRAKE PAD OF A DISK BRAKE OF SAID TYPE

(71) Applicant: WABCO Europe BVBA, Brussels (BE)

(72) Inventor: Joachim Halfmann, Venningen (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 14/907,386

(22) PCT Filed: May 23, 2014

(86) PCT No.: PCT/EP2014/001396
§ 371 (c)(1),
(2) Date: Jan. 25, 2016

(87) PCT Pub. No.: WO2015/014418
PCT Pub. Date: Feb. 5, 2015

(65) Prior Publication Data
US 2016/0169305 A1 Jun. 16, 2016

(30) Foreign Application Priority Data
Jul. 29, 2013 (DE) .................. 10 2013 012 547

(51) Int. Cl.
*F16D 55/00* (2006.01)
*F16D 55/226* (2006.01)
(Continued)

(52) U.S. Cl.
CPC ....... *F16D 55/226* (2013.01); *F16D 65/0056* (2013.01); *F16D 65/0068* (2013.01);
(Continued)

(58) Field of Classification Search
CPC ..... F16D 65/567; F16D 55/226; F16D 55/227
(Continued)

(56) References Cited

U.S. PATENT DOCUMENTS 3,783,981 A * 1/1974 Burgdorf .............. F16D 65/567
188/106 F
4,072,217 A * 2/1978 Inoue .................... F16D 55/227
188/73.34
(Continued)

FOREIGN PATENT DOCUMENTS

DE 694 03 650 T2 10/1997
DE 196 53 488 A1 7/1998
(Continued)

OTHER PUBLICATIONS

European Patent Office, Rijswijk, Netherlands, Translated International Search Report of International Application No. PCT/EP2014/001396 dated Sep. 4, 2014, 3 pages.

*Primary Examiner* — Christopher Schwartz
(74) *Attorney, Agent, or Firm* — Brinks Gilson & Lione

(57) ABSTRACT

A disk brake includes a brake disk, a brake caliper, which fits over the brake disk, a brake support, a brake pad and an application device, which presses the brake pad against the brake disk when braking, wherein the brake pad rests in a U-shaped well and the two legs of the "U" serve to support the brake pad in the circumferential direction of the brake disk and the "base" of the "U" serves to support the brake pad radially toward the inside. The distance between the two legs of the "U" is shorter at the radially outer ends thereof than the distance at the radially inner ends thereof.

18 Claims, 7 Drawing Sheets

(51) Int. Cl.
   *F16D 65/092* (2006.01)
   *F16D 65/095* (2006.01)
   *F16D 65/00* (2006.01)
   *F16D 65/02* (2006.01)

(52) U.S. Cl.
   CPC ......... *F16D 65/092* (2013.01); *F16D 65/095* (2013.01); *F16D 2055/0008* (2013.01); *F16D 2055/0016* (2013.01); *F16D 2065/026* (2013.01)

(58) Field of Classification Search
   USPC ............ 188/1.11 L, 1.11 R, 72.4–72.8, 73.1, 188/73.31–73.39, 73.46, 73.47, 156–164, 188/250 B, 250 G
   See application file for complete search history.

(56) References Cited

U.S. PATENT DOCUMENTS

| | | | |
|---|---|---|---|
| 4,373,616 A | | 2/1983 | Kondo |
| 4,881,623 A | * | 11/1989 | Kondo ................. F16D 55/227 188/73.36 |
| 6,286,636 B1 | * | 9/2001 | Iwata ................. F16D 65/0978 188/73.31 |
| 6,491,138 B1 | * | 12/2002 | Spagele ................. F16D 55/14 188/70 B |
| 7,926,631 B2 | * | 4/2011 | Roberts ................. F16D 55/226 188/250 B |

FOREIGN PATENT DOCUMENTS

| | | |
|---|---|---|
| DE | 10 2004 002 571 A1 | 12/2004 |
| EP | 2 570 689 A1 | 3/2013 |

* cited by examiner

DISK BRAKE, IN PARTICULAR FOR UTILITY VEHICLES, AND BRAKE PAD OF A DISK BRAKE OF SAID TYPE

TECHNICAL FIELD OF THE INVENTION

The invention relates to a disk brake, in particular for commercial vehicles, having a brake disk, a brake caliper, which fits over the brake disk, a brake support, a brake pad and an application device, which presses the brake pad against the brake disk when braking, wherein the brake pad rests in a U-shaped well and the two legs of the "U" serve to support the brake pad in the circumferential direction of the brake disk and the "base" of the "U" serves to support the brake pad radially toward the inside.

The invention furthermore relates to a brake pad of such a disk brake, which has two supporting surfaces, forming the legs of a "U", for support in the circumferential direction and a supporting surface, forming the base of the "U", for support radially toward the inside.

BACKGROUND OF THE INVENTION

DE 10 2004 002 571 A1 shows a disk brake and a brake pad of the abovementioned type.

Disk brakes generally have brake pads guided and supported in pad wells on both sides of a brake disk, said brake pads being pressed against the brake disk by means of an application device arranged in the brake caliper during a braking process. In this case, the brake pad generally comprises a thick, flexurally stiff metal backplate as a pad support, which is produced as a casting or as a formed sheet-metal part and on which the friction lining is mounted. The stability of the backplate is intended to ensure that the friction lining is pressed against the brake disk uniformly and in full surface contact as far as possible. The dimensions of the backplate and the friction lining in the radial direction are such that they cover the friction strip of the brake disk in the radial direction.

The brake pad is supported and guided by means of its metal backplate in the respective pad well, which is formed on the brake support or the brake caliper.

The pad wells are delimited on the disk entry and disk exit side, i.e. in the circumferential direction, by supporting horns, on which the brake pads are supported under load by means of their side faces when they come into frictional contact with the brake disk, wherein the respective supporting horn subjected to load absorbs the braking torque acting on the associated brake pad.

Radially on the inside, the brake pads rest on supporting surfaces of the pad well, which are generally flat. Overall, the wells are generally of U-shaped design.

As regards their contours or as regards their dimensioning, the brake pad and the pad well are matched to one another in accordance with the embodiment/size of the brake. The supporting surfaces forming the U-shaped well, which can come into operative contact with the brake pad, are machined in the case of the component produced from cast material in which the well is formed, i.e. the brake caliper or the brake support, in order to ensure the required surface finish and the required dimensional accuracy.

In this machining process, the aim is, for reasons of economy in large-scale manufacture, to produce supporting surfaces which, as far as possible, can be obtained quickly, simply and without time-consuming tool changes. The supporting surfaces to be machined should therefore be level or smooth. In this case, machining operations with an end mill or a hobbing cutter, for example, are possible.

In the case of known disk brakes, e.g. according to DE 10 2004 002 571 A1, the well is generally rectangular, i.e. the legs of the "U" are at an angle of 90° (ignoring tolerances) to the "base" of the "U". On the one hand, this embodiment simplifies machining. On the other hand, it is possible in this case for the brake pad to be inserted and removed in the radial direction through a corresponding installation opening in the brake caliper for the purpose of installation/removal. To ensure this, the well is rectangular, as already explained above. In other words, the distance between the two legs of the "U" is the same at the radially outer ends thereof as the distance at the radially inner ends thereof.

Particularly in the case of the pad well embodied as a rectangle, the brake pads must be secured against falling out by means of a hold-down system (springs/hold-down clip) of robust design secured on the brake caliper. Moreover, the hold-down system serves to compensate necessary functional clearances or tolerances.

Because of the limited space available for the brake, the radial extent of the lateral supporting horns is limited. It is therefore not possible for the lateral supporting surfaces formed thereon reliably to prevent the brake pad being twisted out during a braking process. As a result, the release behavior of the pad after a braking process may be impaired.

DE 694 03 650 T2 shows a pad support which tapers radially inward in plan view and is provided with lateral projections, which engage positively in lateral guide grooves of the pad well. Embodiments of this kind are known from relatively small disk brakes used in the passenger car sector. In this context, steel springs arranged in the guide grooves and serving to compensate bearing play are often used. The relatively small contact surfaces formed in this case cannot absorb the circumferential torques of the kind which arise with commercial vehicles. It would be uneconomic to enlarge the relevant surfaces to eliminate this problem because the production and machining of said surfaces would require special tools (form cutters) and a high outlay on conversion (machine/equipment). Moreover, the caliper of the brake according to DE 694 03 650 T2 does not have a radial opening for the installation/removal of the brake pads. The brake caliper must therefore be removed to install/remove the pad. Finally, it is also only possible to remove the brake pads from the positive engagement regions in an axial direction.

SUMMARY OF THE INVENTION

It is the underlying object of the invention to develop the disk brake of the type stated at the outset in such a way that, on the one hand, machining of the supporting surfaces of the well is simple and, on the other hand, that there is no risk that the brake pad will be twisted out or will fall out of the well.

According to the invention, the stated object is achieved, in the case of a disk brake of the type stated at the outset, by virtue of the fact that the distance between the two legs of the "U" is shorter at the radially outer ends thereof than the distance at the radially inner ends thereof.

According to the invention, the "end" of a leg is in each case taken to mean the radially inner or radially outer end of the supporting surface acting in the circumferential direction.

The base of the "U" can be arc-shaped in at least some section or sections.

In addition or as an alternative, provision can be made, according to the invention, for a section of the well contour which serves to provide radially inward support to extend in a straight line and to enclose an angle of at least 2°, preferably at least 3°, with a plane perpendicular to a center plane of the brake pad, which passes through the brake axis.

According to a particularly preferred embodiment of the invention, it is envisaged that a first section of the well contour, said section serving to provide radially inward support, extends in a straight line and encloses a first angle with a plane perpendicular to a center plane of the brake pad, which passes through the brake axis, and a second section of the well contour, said section serving to provide radially inward support, extends in a straight line and encloses a second angle with the plane perpendicular to the center plane of the brake pad, which passes through the brake axis, wherein the first and second angles are equal.

According to another embodiment, however, it is also possible for the two angles to be different.

As another preferred option, it is envisaged that a section of the well contour which provides radially inward support extends in a straight line and encloses an angle in a range of from 75° to 105°, preferably 90°, (ignoring tolerances) with a leg of the "U".

According to the invention, the brake pad is situated on an application side of the brake disk.

According to the invention, the well is furthermore preferably formed on the brake support. However, it can also be formed on the brake caliper.

According to the invention, the brake caliper is furthermore preferably a sliding caliper.

According to another preferred embodiment of the invention, the brake caliper has an installation opening for installing/removing the brake pad radially from the outside.

According to the invention, a hold-down device for holding the brake pad in the well is furthermore preferably provided.

The brake according to the invention can have an adjusting device for adjustment in the case of wear.

The brake pad according to the invention is distinguished by the fact that distance between the two legs of the "U" is shorter at the radially outer ends thereof than the distance at the radially inner ends thereof.

It is once again the case that the "end" of a leg is taken to mean that end of the supporting surface of the brake pad effective in the circumferential direction which is radially on the outside or radially on the inside.

The supporting surface forming the base of the "U" can be arc-shaped in at least some section or sections.

According to the invention, it is particularly preferred that the base of the "U" be rectilinear in at least some section or sections.

According to a particularly preferred embodiment of the invention, it is envisaged that a section of the supporting surface for providing radially inward support extends in a straight line and encloses an angle of at least 2°, preferably at least 3°, with a plane perpendicular to a center plane of the brake pad, which passes through the brake axis.

According to a particularly preferred embodiment of the invention, it is envisaged that a first section of the supporting surface forming the base of the "U" extends in a straight line and encloses a first angle with a plane perpendicular to a center plane of the brake pad, which passes through the brake axis, and a second section of the supporting surface forming the base of the "U" extends in a straight line and encloses a second angle with the plane perpendicular to the center plane of the brake pad, which passes through the brake axis, wherein the first and second angles are equal.

However, it is also possible to envisage, according to the invention, that the two angles mentioned are different.

According to another preferred embodiment of the invention, it is envisaged that, in the case of the brake pad, a section of the supporting surface forming the base of the "U" extends in a straight line and encloses an angle in a range of from 75° to 105°, preferably 90°, (ignoring tolerances) with a leg of the "U".

Finally, the brake pad according to the invention is preferably the brake pad on the application side.

In preferred embodiments according to the invention, the legs of the "U" form an angle of 90° with rectilinear sections of the base thereof, both in the case of the well and of the pad support. However, the rectilinear sections of the base enclose an angle which is 2° or more, preferably 3° or more, with a plane which is perpendicular to a center plane of the brake pad, which passes through the brake axis.

This correlates with the fact that the distance between the two legs of the "U" is shorter at the radially outer ends thereof than the distance at the radially inner ends thereof.

The supporting surfaces are level both on the well and on the pad support. This gives optimized machining and support/bearing regions (contact regions).

The radial contact regions are situated on both sides of the brake axis and, for reasons of stability, are advantageously connected to one another by means of a connecting yoke, which is preferably of arc-shaped configuration.

This solution has several advantages:

The machining tool (end mill or form cutter) does not have to be a special tool with special contours. During the machining of the contact surfaces, it is merely tilted or set at the angle corresponding to the angle of incidence of the rectilinear section of the base of the "U". Accordingly, the backplates of the brake pads can also be produced economically (without undercuts or shoulders or projections).

As regards the procedure in the production of the brake or brake pad, no changes are required in comparison with the conventional method.

In the solution according to the invention, there is no risk that the brake pad will be twisted out or fall out because the supporting horns fit over the radially outer backplate region. They extend radially outward in a V shape. It is thus also possible to implement savings of material on the hold-down clip and on the hold-down spring because excessive radial movements of the pad, e.g. under rough road conditions or a spring break, no longer have to be absorbed solely by the hold-down clip and the hold-down spring but can also be absorbed by the radial positive engagement owing to the V shape. In the solutions according to the invention too, it is preferred that the hold-down springs should compensate functional clearances and tolerances in the bearing/support regions—as in the prior art.

If the angles of incidence of the rectilinear sections of the base of the "U" are equal, there is advantageously mirror symmetry between the brake pad on the application side on a left-hand/right-hand brake on the vehicle axle, making it easier to allocate the pads during installation.

Because the two legs of the "U" extend toward one another in a radially outward direction, axial installation of the brake pad in the corresponding well guide is required after the pad has been introduced radially from the outside into the caliper via the caliper opening. The same applies in reverse sequence for removal.

It is for this reason also that the invention is only implemented on one of the two sides of the brake, e.g. the application side, in this embodiment, in this case on a sliding caliper. Because of the brake disk and the attached brake caliper, the pads generally do not fit into such guides on both sides.

The "hybrid embodiment" is therefore preferably used. In other words, one pad and one well as in conventional brakes is used on the rim side, while the solution according to the invention is used on the application side. This also has the advantage that different grades of friction material to be used in a brake configuration cannot be installed on the wrong side in the brake because of the different shapes of backplate/pad well.

For installation, the pressure part/the pressure spindle is retracted, without removing the brake caliper, until there is enough axial free space between the caliper housing and the pad well guide on the application side first of all to maneuver the brake pad of appropriate thickness into an intermediate position via the radial opening and then, after this, to push it toward the brake disk into the corresponding well guide in an axial direction. After this, given an appropriate caliper alignment, the rim-side brake pad can then be installed radially. The hold-down system is then installed. Removal takes place in the reverse sequence.

In terms of size, even if the abovementioned angles of incidence are equal, these can differ in angular steps relative to the plane perpendicular to a center plane of the brake pad, which passes through the brake axis, depending on the type of brake, making it easier, in particular, to allocate the correct brake pads to the correct disk brake. It is thereby possible to produce a coding. If, namely, the angle ratios on the application side do not match, installation is impossible because surfaces interfere.

However, depending on the load and use of the brake in the vehicle, it is furthermore also possible for said angles of incidence to be different. This can be either on the brake entry side or the brake exit side, as desired and depending on the use, thereby resulting in load-optimized bearing arrangements, where appropriate. In general, load optimization of the brake part is achieved with the angles of incidence (whether equal or different), as compared with the "rectangular" well, because circumferential moments are now also increasingly introduced in a distributed way as compressive stresses into the radial regions.

Precise allocation by means of coding is thereby also possible. The geometrical relationships can be chosen in such a way, for example, that there is surface interference in the case of incorrect installations. It is also possible to ensure that the radial spacing for the required functional clearance (distance between the hold-down clip and the upper edge region of the backplate) is no longer present in the case of incorrect installation, with the result that the hold-down clip comes to rest on top and can no longer be supported correctly in the brake caliper and secured thereon.

BRIEF DESCRIPTION OF THE DRAWINGS

The invention is explained in greater detail below by means of preferred illustrative embodiments with reference to the attached drawing, in which.

DETAILED DESCRIPTION OF THE DRAWINGS

Figure 1:
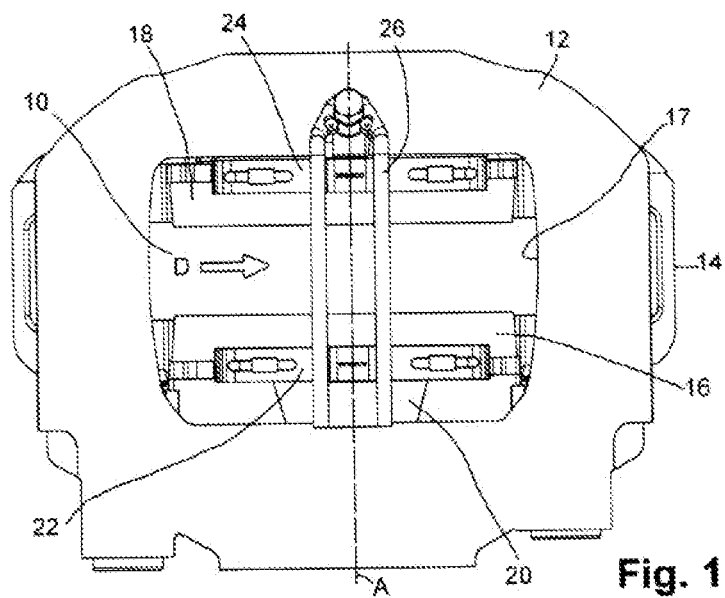
FIG. 1 shows a plan view of a disk brake according to the invention.
Figure 2:
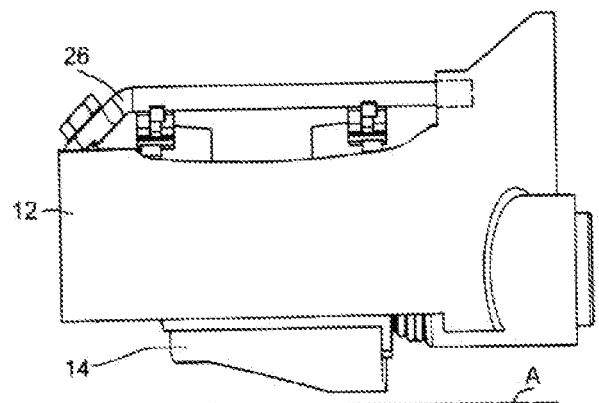
FIG. 2 shows a side view of the brake shown in FIG. 1.

The disk brake illustrated in the drawings includes a brake disk 10, a brake caliper 12 fitting over the brake disk 10, a brake support 14, an application-side brake pad 16, a rim-side brake pad 18 and an application device 20, indicated only schematically. To hold down the brake pads 16 and 18, which consist of a metal backplate and friction material, use is made of hold-down springs 22 and 24, which are preloaded radially inward by a hold-down clip 26. The hold-down clip 26 extends over an installation opening 17 in the direction of the brake axis A and is secured firmly but detachably on the brake caliper.

The brake axis is denoted by the letter A, while the preferential direction of rotation of the brake disk 10 is denoted by an arrow D. The letter M denotes a center plane of the application-side brake pad 16, which passes through the brake axis A, and a plane E perpendicular thereto is horizontal in the illustrations according to FIGS. 4 to 8.

The brake caliper 12 has the installation opening 17, through which the brake pads 16, 18 can be introduced radially from the outside into the interior of the brake caliper 12 and removed again. The application device 20 is provided with an adjusting device (not shown in the drawing) for wear compensation.

Figure 3:
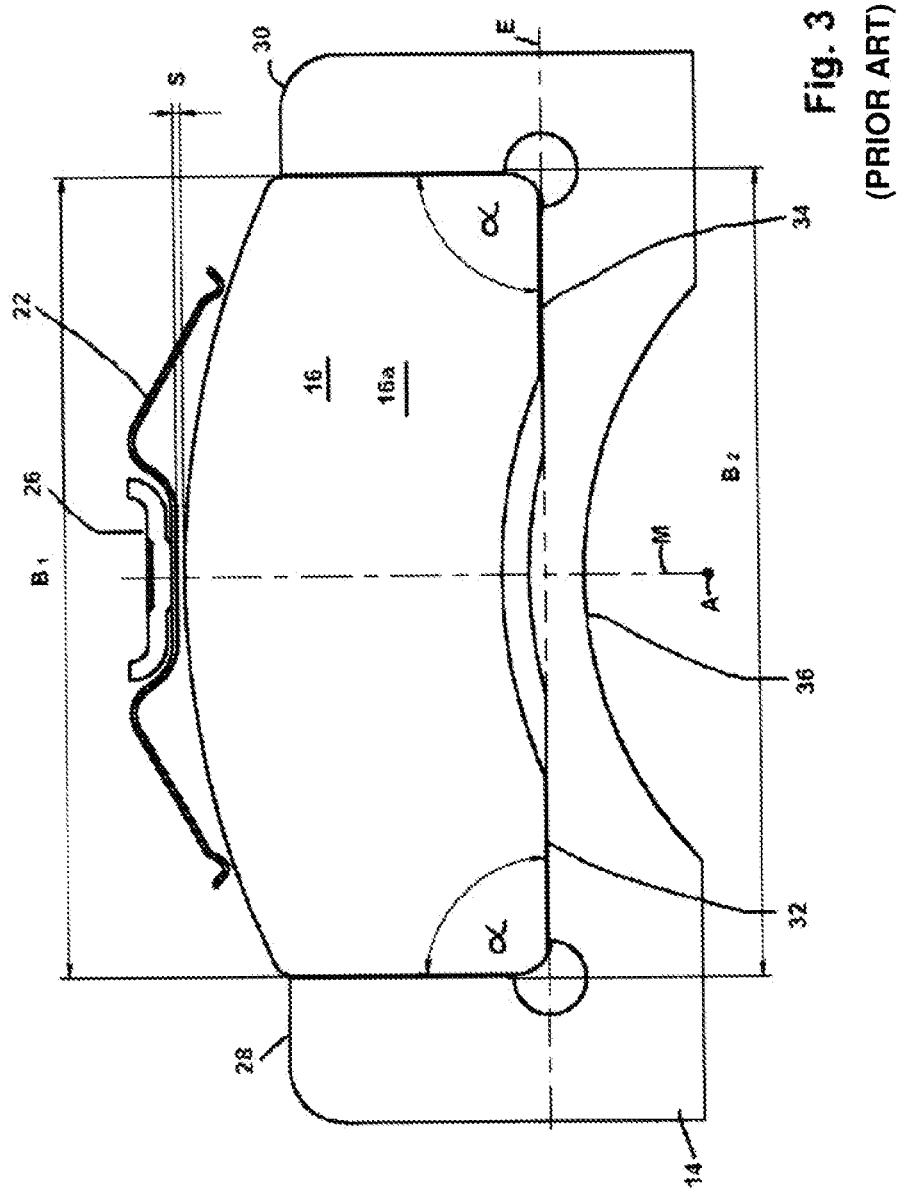
FIG. 3 shows a schematic sectioned partial view of a brake according to the prior art.

FIG. 3 shows the application-side brake pad 16 in plan view of its backplate 16a. It is arranged in a U-shaped well, wherein the legs of the "U" are formed by supporting horns 28, 30, which are formed integrally with the brake support 14, and the base is formed by two rectilinear supporting surfaces 32, 34 and an arc-shaped connecting yoke 36.

There is a radial functional clearance S between the hold-down spring 22, which is preloaded by the hold-down clip 26, and the backplate 16a.

The supporting horns 28 and 30 support the backplate 16a and hence the brake pad 16 in the circumferential direction. The supporting surfaces 32 and 34 provide support in a radially inward direction.

In the conventional disk brake according to FIG. 3, the supporting horns 28 and 30 enclose a right angle α with the two supporting surfaces 32 and 34. Moreover, their supporting surfaces, which define the well, extend parallel to one another, with the result that the well has what is overall a rectangular contour. In other words, the distance $B_1$ between the supporting horns forming the legs of the "U" is the same size at the radially outer ends thereof as the distance $B_2$ at the radially inner ends thereof.

In the case of rough sections of road, for example, radially outward movements of the brake pad 16 and/or of the backplate 16a must be absorbed fully by the hold-down spring 22 and the hold-down clip 26.

Figure 4:
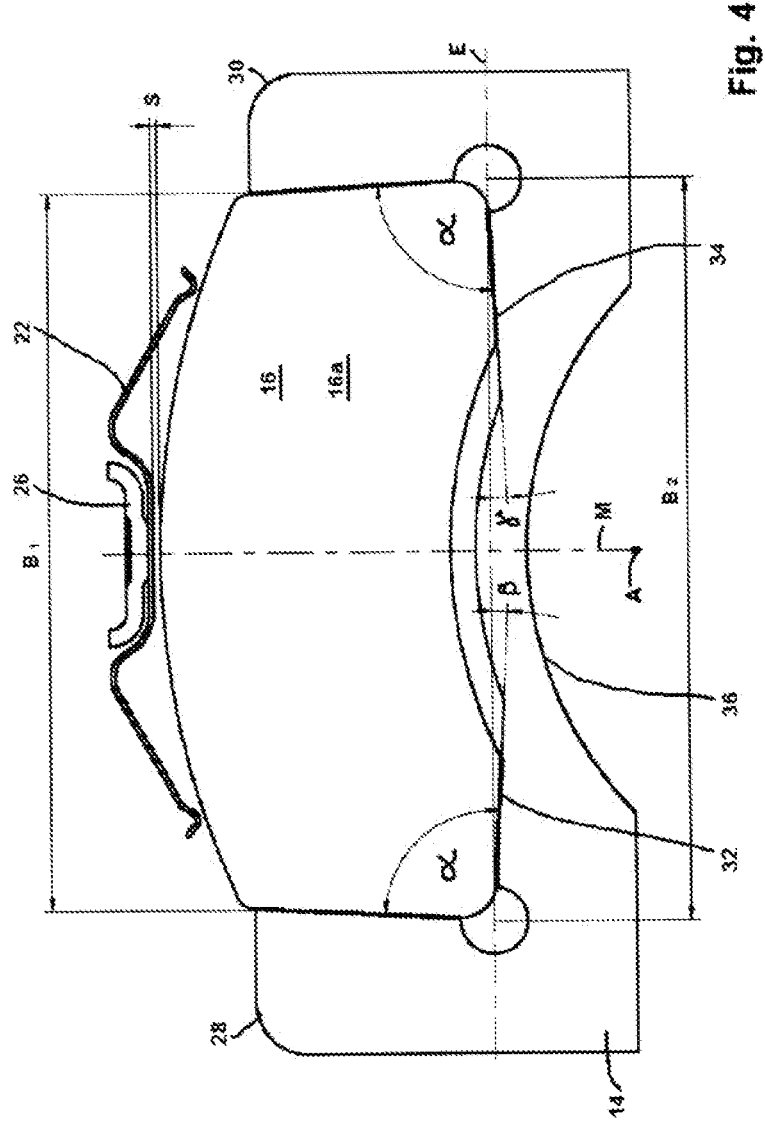
FIG. 4 shows the same view as FIG. 3, this being however of a first illustrative embodiment of the invention.

The situation is different with the illustrative embodiment of the invention according to FIG. 4:

Here, the distance $B_1$ (radially on the outside) is shorter than the distance $B_2$ (radially on the inside). In other words, the two legs of the "U" are not parallel to one another but extend toward one another in a radially outward direction. As a result, the brake support 14 or the supporting horns 28 and 30 contributes or contribute to securing the brake pad 16 against a radially outward movement.

Even though the two legs of the "U" extend toward one another in a radially outward direction, they each form an angle α of 90° (ignoring tolerances) with the supporting surfaces 32 and 34. Therefore, they enclose an angle β and γ with the plane E, said angle being approximately 3° in the illustrative embodiment shown in FIG. 4. While the angles β and γ are equal, the angular position can also be modified or increased in angular steps, thereby ensuring coding produced between the brake pad and the well contour. Exact allocation of the correct brake pad to the correct brake embodiment is thereby ensured. If the angular positions of the brake pad and the well contour do not match, installation is not possible because the surfaces interfere.

Especially if the angle α is 90°, machining of the supporting surfaces on the brake support 14 (supporting horns 28, 30/supporting surfaces 32, 34) is particularly simple because it is possible to work with very simple tools.

The above descriptions refer especially to the embodiment of the brake support 14 to form the U-shaped well. However, they also apply analogously to the brake pad 16, which has an outer contour corresponding to the well. Of course, that applies not only to the embodiment according to FIG. 4 but also to the embodiment according to FIG. 5.

Figure 5:
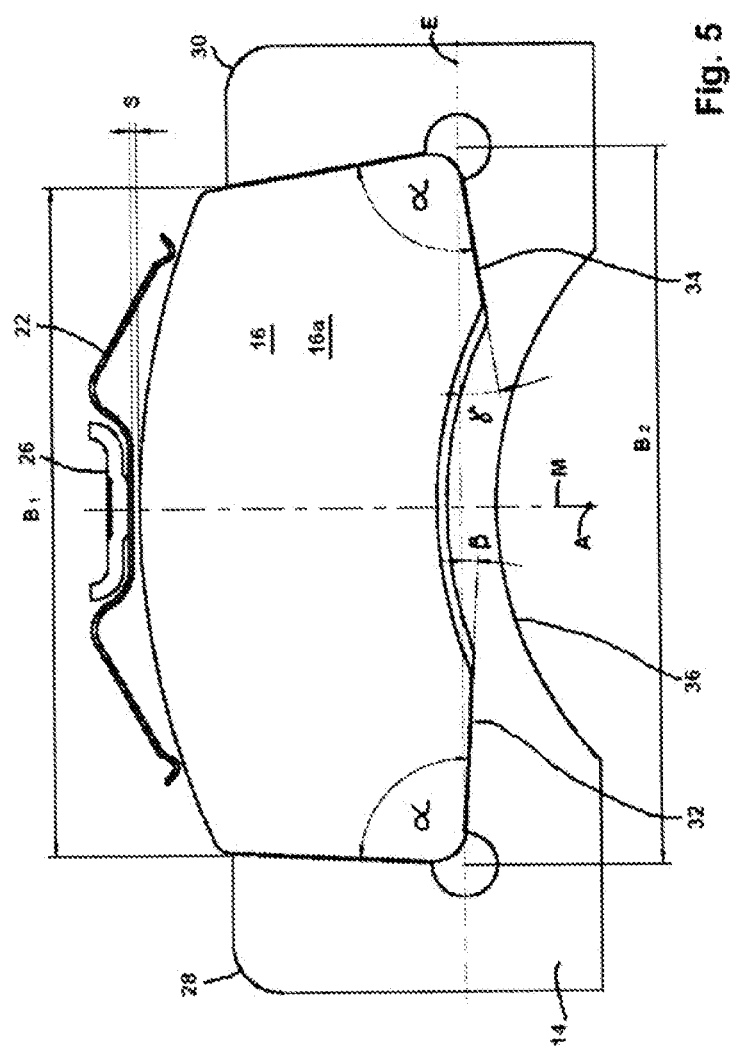
FIG. 5 shows the same view as FIG. 3, this being however of a second illustrative embodiment of the invention.

The embodiment according to FIG. 5 differs from that according to FIG. 4 in that the angles β and γ are not equal. This has advantages, especially in respect of any desired coding. In this connection, attention is drawn to FIGS. 6 to 8, which show combinations that do not match because the codings do not match.

Figure 6:
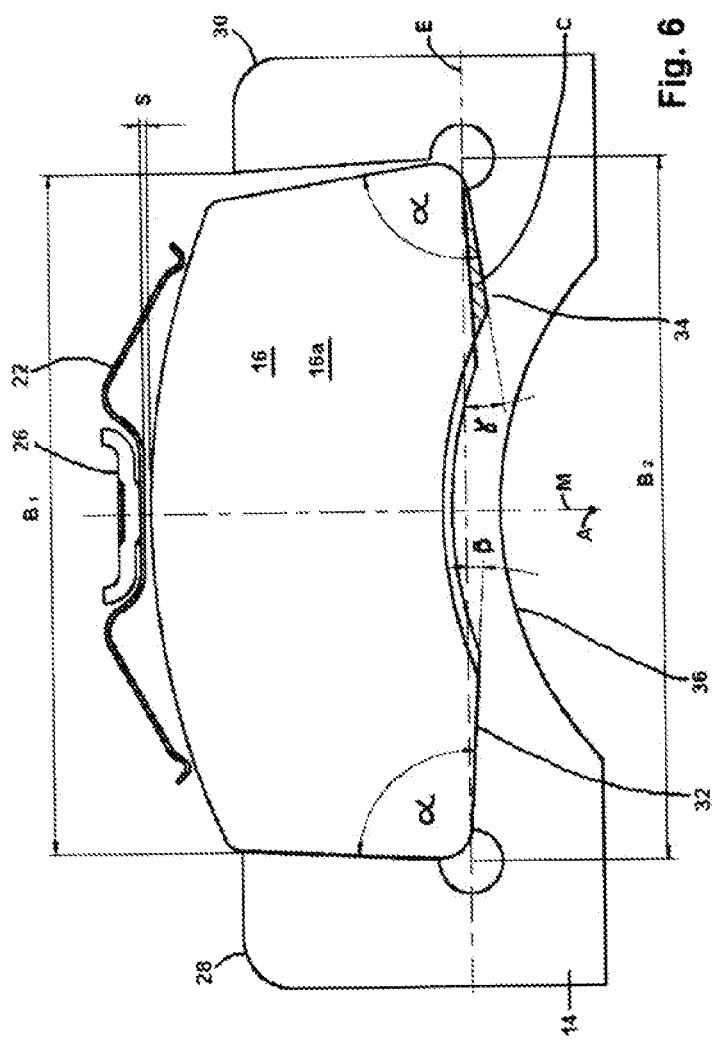
FIGS. 6 to 8 show the same views as FIG. 3 but in each case illustrate cases of incorrect installation.

In the example according to FIG. 6, the angles β and γ in the well are equal but unequal on the inserted brake pad, for which reason installation is not possible owing to an interference C.

Figure 7:
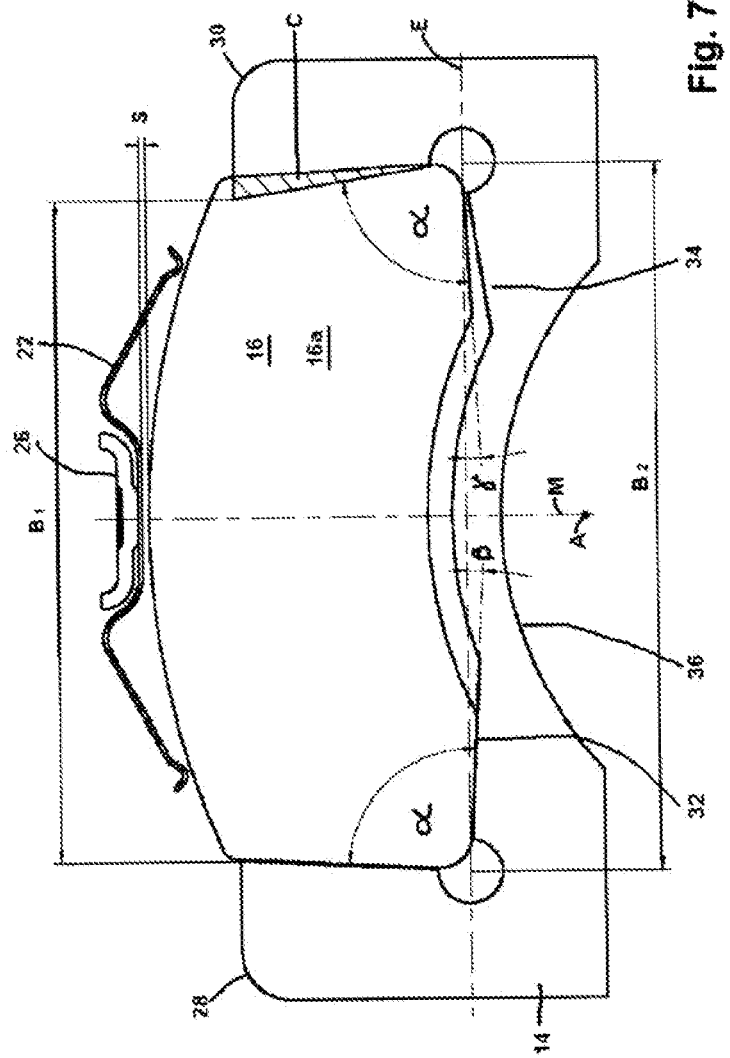

In the example according to FIG. 7, the situation is reversed: here, the angles β and γ are equal in the well but different on the brake pad. Once again, installation is not possible owing to an interference C.

Figure 8:
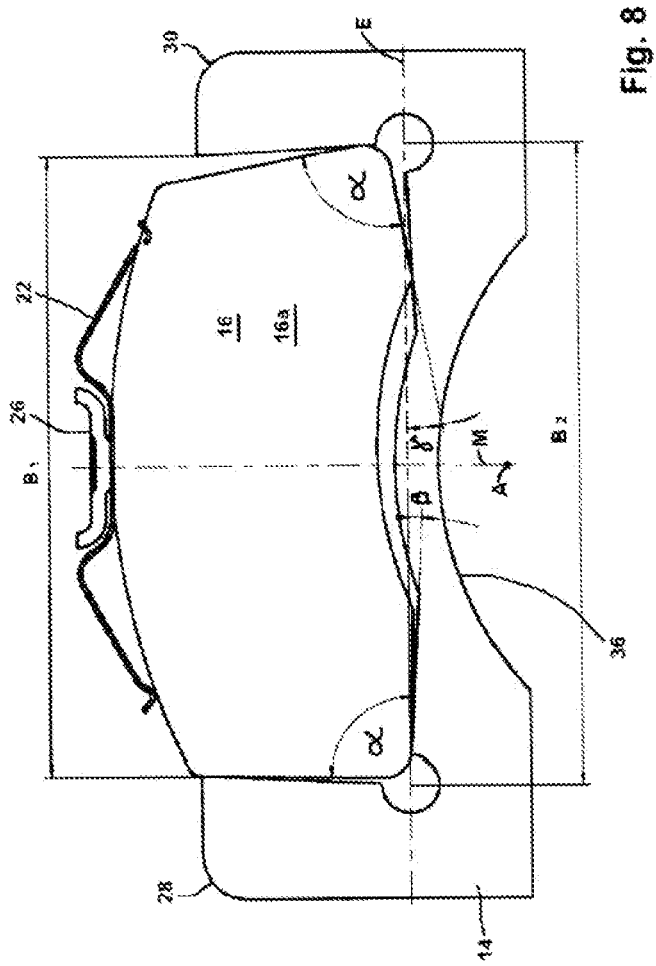

In the case of the illustrative embodiment according to FIG. 8 too, the brake pad and the well do not match, for which reason the brake pad is too far out overall in the radial direction. In particular it is too far out by a distance which is greater than the radial functional clearance S, for which reason not only is there no longer any functional clearance but also it is no longer possible to install the hold-down clip 26.

The features of the invention which are disclosed in the above description, claims and the drawing may be essential either individually or in any desired combinations to the implementation of the invention in the various embodiments thereof. Attention is likewise drawn to the fact that the two sections/supporting surfaces of the pad well which serve to provide radial support to the brake pad do not necessarily have to be connected to one another by a connecting yoke. The effect of the invention is also achieved without the connecting yoke.

While the above description constitutes the preferred embodiments of the present invention, it will be appreciated that the invention is susceptible to modification, variation and change without departing from the proper scope and fair meaning of the accompanying claims.

The invention claimed is:

1. A disk brake comprising:
   a brake disk (10) defining a brake axis,
   a brake caliper (12), which fits over the brake disk,
   a brake support (14),
   a brake pad (16, 16a and 18) defining a center plane that passes through the brake axis; and
   an application device (20), which presses the brake pad against the brake disk when braking, wherein
   the brake pad rests in a well of the brake caliper having a U-shape with two legs and a base, and the two legs (28, 30) of the U-shape forming support surfaces configured to contact lateral sides of a brake pad to support the brake pad in a circumferential direction of the brake disk and the base (32, 34, 36) of the U-shape serves to support the brake pad radially toward the inside,
   wherein the two legs of the U-shape are oriented at an angle relative to each other so that the a distance (B1) between the support surfaces forming the two legs of the U-shape is shorter at radially outer ends of the two support surfaces than a distance (B2) at radially inner ends of the two support surfaces, and the base has two base sections forming further support surfaces, each of which is rectilinear adjacent one of the two legs and encloses an angle of at least 2° with a tangential plane that is perpendicular to the center plane of the brake pad,
   wherein each of the further supporting surfaces forming the base of the "U" extends in a straight line and encloses an angle (a) in a range of from 75° to 105° with an adjacent one of the support surfaces of the two legs of the "U".

2. The disk brake as claimed in claim 1, further comprising a hold-down device (22, 24, 26) for holding the brake pad in the well.

3. The disk brake as claimed in claim 1, further comprising an adjusting device for adjustment in the case of wear.

4. The disk brake as claimed in claim 1, wherein the base (32, 34, 36) of the U-shape is arc-shaped in at least some section or sections (36) between the two base sections.

5. The disk brake as claimed in claim 1, wherein a section (32, 34) of the well contour that serves to provide radially inward support extends in a straight line and encloses an angle (β, γ) of at least 23° with the tangential plane (E) perpendicular to the center plane (M) of the brake pad (16, 16a, 18), which passes through the brake axis (A).

6. The disk brake as claimed in claim 1, wherein
   a first base section (32) of the two base sections extends in a straight line and encloses a first angle (β) with the tangential plane (E) perpendicular to the center plane (M) of the brake pad (16, 16a, 18), which passes through the brake axis (A), and
   a second base section (34) of the two base sections extends in a straight line and encloses a second angle (β) with the tangential plane (E) perpendicular to the center plane (M) of the brake pad (16, 16a, 18), which passes through the brake axis (A), wherein
   the first and second angles are equal.

7. The disk brake as claimed in claim 1, wherein
   a first section (32) of the two base sections extends in a straight line and encloses a first angle (β) with the tangential plane (E) perpendicular to the center plane (M) of the brake pad (16, 16a, 18), which passes through the brake axis (A), and
   a second section (34) of the two base sections extends in a straight line and encloses a second angle (γ) with the tangential plane (E) perpendicular to the center plane (M) of the brake pad (16, 16a, 18), which passes through the brake axis (A), wherein
   the first and second angles are different.

8. The disk brake as claimed in claim 1, wherein the brake pad (16, 16a) is situated on an application side of the brake disk.

9. The disk brake as claimed in claim 1, wherein the well is formed on the brake support (14).

10. The disk brake as claimed in claim 1, wherein the well is formed on the brake caliper (12).

11. The disk brake as claimed in claim 1, wherein the brake caliper (12) is a sliding caliper.

12. The disk brake as claimed in claim 1, wherein the brake caliper (12) has an installation opening (17) for radially installing and removing the brake pad (16, 16a, 18).

13. The disk brake as claimed in claim 1, wherein the enclosed angle is a right angle.

14. A brake pad of a disk brake, comprising:
two supporting surfaces, forming legs of a "U" for support in the circumferential direction and two further supporting surfaces, forming sections of a base of the "U", for support radially toward the inside,
wherein the two legs of the "U" are oriented at an angle relative to each other so that the distance between the two legs of the "U" is shorter at radially outer ends thereof than the distance at radially inner ends thereof, and
wherein each of the two further sections is rectilinear adjacent one of the two legs and encloses an angle of at least 2° with a tangential plane that is perpendicular to a center plane of the brake pad,
wherein each of the further supporting surfaces forming the base of the "U" extends in a straight line and encloses an angle (a) in a range of from 75° to 105° with an adjacent one of the supporting surfaces of the two legs of the "U".

15. The brake pad as claimed in claim 14, wherein the two further supporting surfaces forming the sections of the base of the "U" are located on lateral sides of an arc-shaped section.

16. The brake pad as claimed in claim 14, wherein
a first section of one of the two further supporting surfaces forming the sections of the base of the "U" extends in a straight line and encloses a first angle ($\beta$) with a plane (E) perpendicular to a center plane (M) of the brake pad, which passes through the brake axis (A),
a second section of the other one of the two further supporting surfaces forming the sections of the base of the "U" extends in a straight line and encloses a second angle ($\gamma$) with the plane perpendicular to the center plane (M) of the brake pad, which passes through the brake axis (A), and
the first and second angles are equal.

17. A brake pad of a disk brake, comprising:
two supporting surfaces, forming legs of a "U" for support in the circumferential direction and two further supporting surfaces, forming sections of a base of the "U", for support radially toward the inside,
wherein the distance between the two legs of the "U" is shorter at radially outer ends thereof than the distance at radially inner ends thereof, and
wherein each of the two further sections is rectilinear adjacent one of the two legs and encloses an angle of at least 2° with a tangential plane that is perpendicular to a center plane of the brake pad, wherein
a first section of one of the two further supporting surfaces forming the sections of the base of the "U" extends in a straight line and encloses a first angle ($\beta$) with the tangential plane (E) perpendicular to the center plane (M) of the brake pad, which passes through the brake axis (A),
a second section of the other one of the two further supporting surfaces forming the sections of the base of the "U" extends in a straight line and encloses a second angle ($\gamma$) with the tangential plane perpendicular to the center plane (M) of the brake pad, which passes through the brake axis (A), wherein
the first and second angles are different.

18. The brake pad as claimed in claim 14, wherein the enclosed angle is a right angle.

* * * * *